Dec. 24, 1968    G. C. CORLEY    3,417,877
PORTABLE HOIST

Filed Dec. 30, 1965    4 Sheets-Sheet 1

INVENTOR
GALE C. CORLEY
BY *Mueller, Aichele & Rauner*
ATTORNEYS

Dec. 24, 1968   G. C. CORLEY   3,417,877
PORTABLE HOIST
Filed Dec. 30, 1965   4 Sheets-Sheet 2
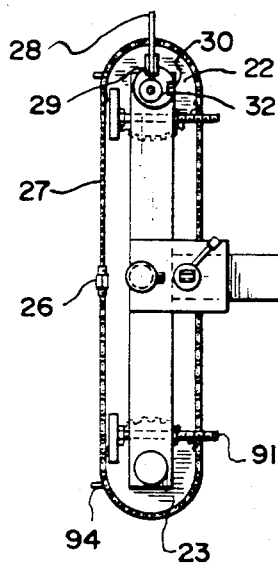
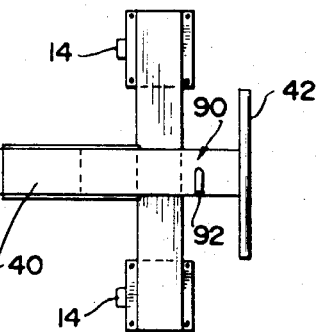
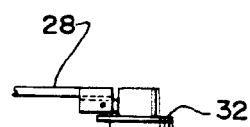
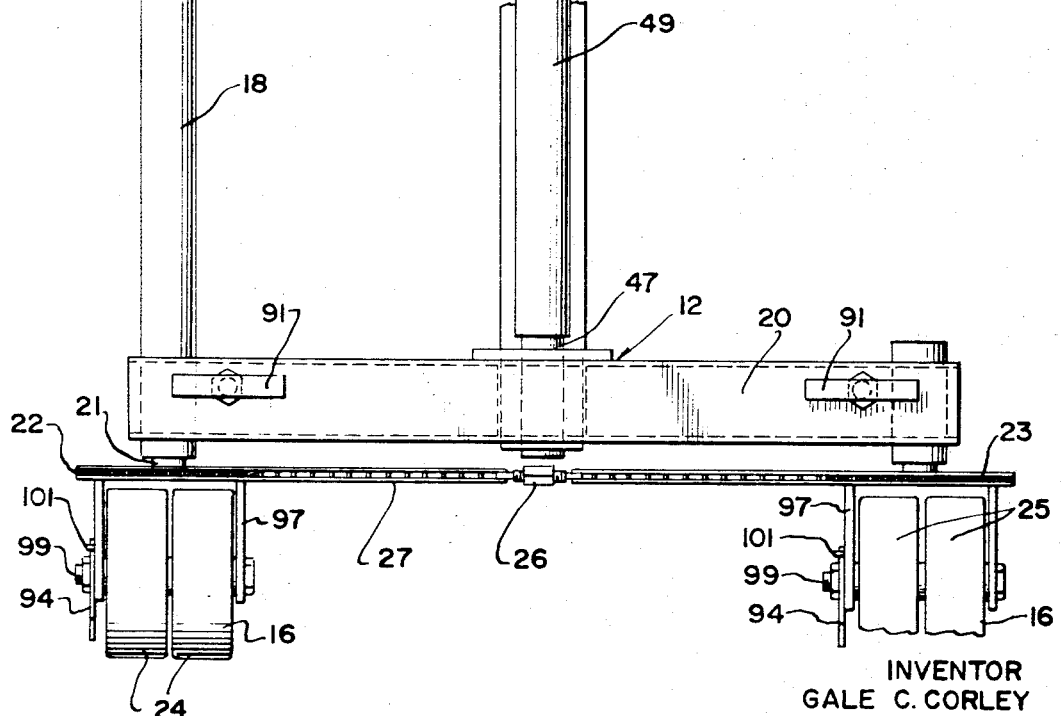
INVENTOR
GALE C. CORLEY
ATTORNEYS

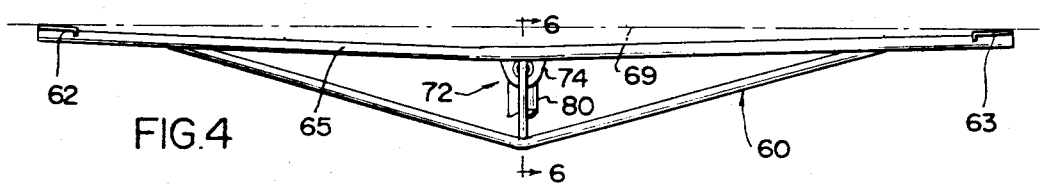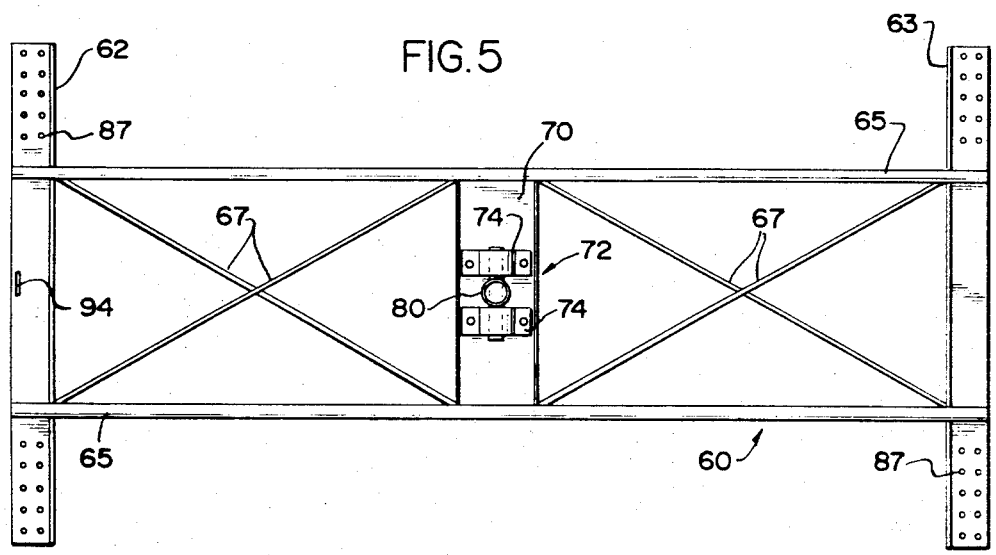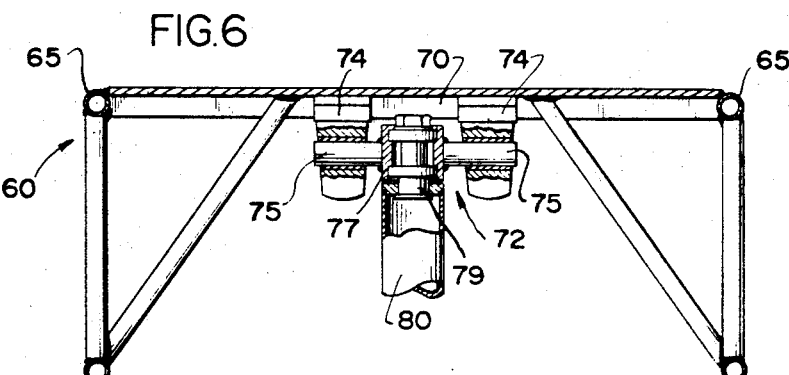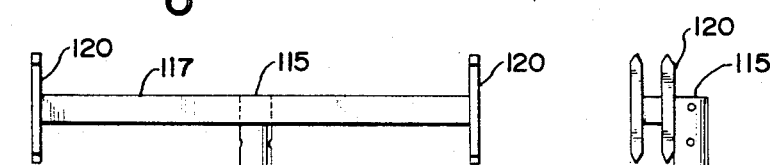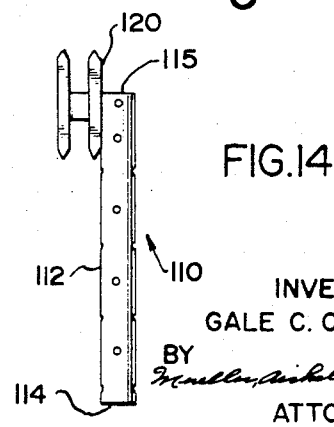

Dec. 24, 1968    G. C. CORLEY    3,417,877
PORTABLE HOIST

Filed Dec. 30, 1965    4 Sheets-Sheet 4

INVENTOR
GALE C. CORLEY

ATTORNEYS

United States Patent Office 3,417,877
Patented Dec. 24, 1968

3,417,877
PORTABLE HOIST
Gale C. Corley, 1207 Beech St.,
Valparaiso, Ind. 46383
Filed Dec. 30, 1965, Ser. No. 517,555
7 Claims. (Cl. 214—1)

ABSTRACT OF THE DISCLOSURE

A device including a movable cart for handling a substantially flat structural member wherein the mounting structure for supporting the member includes a universal pivot joint that permits the mounting structure to be moved about the pivot between the horizontal and vertical planes through an angle of at least 90°, and rotated in a horizontal plane through an angle of at least 180°. Movable stops connected to the cart frame are adjusted so that when the mounting structure is against the stops in the vertical position the structural member is aligned in the vertical plane. Spacers index the cart with respect to a vertical surface for setting the structural member into position.

---

This invention pertains generally to hoists, and more particularly to a portable hoist for handling large structural members used in the construction of pre-fabricated buildings.

In the construction of pre-fabricated buildings, large panels and preformed trusses are used to hold to a minimum the work required in assembling the building. Several men are required to handle such panels and trusses, and very hard work is involved. Portable hoists have been proposed for raising and positioning the panels, but these hoists do not provide all of the modes of movement that are needed in various instances. Also, they have lacked versatility in that they do not provide for the positioning of the trusses in addition to the panels. Furthermore, the proposed hoists are generally of a complex construction which means high costs and complexity of operation.

It is an object of this invention to provide an improved hoist for handling large pre-fabricated structural members.

It is another object of this invention to provide a portable hoist that is of relatively simple construction, relatively inexpensive to manufacture, and can be operated by one man.

It is still another object of this invention to provide an improved portable hoist that will handle trusses and gables as well as the large panels.

It is customary in building pre-fabricated buildings to have the structural members brought to the building site by truck. When unloading the members from the truck prior to commencing construction, they may be stacked in such a manner that they are in a position reversed from the position in which they will be used.

It is a further object of this invention to provide a portable hoist that not only lifts the structural members to move them and set them in position, but also permits the members to be rotated from their stacked position so that they are properly positioned to be set in place.

One feature of this invention is a device for handling a structural member having mounting equipment for supporting the structural member removably connected to a hoist on a panel cart. The panel cart includes a base structure mounted on a set of double wheel casters that may be guided at one end, and on a set of self-following casters at the other end.

Another feature of this invention is a device for handling a substantially flat structural member wherein the mounting equipment for supporting the structural member includes a tilt frame having first and second ends and a bowed intermediate portion. The structural member is mounted to the first and second ends, and the bowed portion provides a clearance for any irregularities in the flat surface of the member.

A further feature of this invention is a device for handling a substantially flat structural member wherein the mounting structure for supporting the member includes a universal pivot joint that permits the tilt frame to be tilted about the pivot between the horizontal and vertical planes through an angle of at least 90°, and rotated about the pivot joint in a substantially horizontal plane through an angle of at least 180°. The tilt frame can be locked to the panel cart when tilted to substantially the horizontal plane.

Another feature of this invention is a device for handling a substantially flat structural member wherein the panel cart has adjustable stops and spacers at one end. The tilt frame rests against the stops when it is positioned in the vertical plane, and the stops are then adjusted to position the frame so the structural member supported thereby is positioned in the vertical plane. The spacers index the cart with respect to a vertical surface.

A further feature of this invention is a device for handling a structural member wherein the mounting equipment for supporting the structural member includes a T-shaped support member having a hollow elongated stem portion open at both ends and a cross beam forming the cap of the T. H-arms are connected to either end of the cross beam and engage and support the member. By using either open end of the stem portion to mount the T-shaped support member to the hoist on the panel cart, the height of the cap portion above the surface the cart is resting on may be varied.

In the drawing:

FIG. 2 is a top plan view of the device of FIG. 1;

FIG. 3 is a front elevation of the device of FIG. 1;

FIG. 4 is a side elevation of the tilt frame in accordance with this invention;

FIG. 5 is a bottom plan view of the device of FIG. 4;

FIG. 6 is an expanded cross-section along the lines 6—6 of the device of FIG. 4;

FIG. 13 is a front elevation view of a part of the device in accordance with this invention; and FIG. 14 is a side elevation view of the device of FIG. 13.

In practicing this invention, mounting equipment for supporting a structural member is removably connected to a hoist on a panel cart. The panel cart is formed by a base structure having a set of self-following casters on one end and a set of double wheel casters at the other end. Means are provided for guiding the double wheel casters in order to steer the cart. The mounting equipment for supporting the structural members may take various forms. For instance, a flat panel section to be used for a wall of a building may be secured to a tilt frame which is secured to the hoist mounted on the panel cart. The tilt frame includes first and second ends to which the structure is secured and a bowed intermediate portion. The bowed intermediate portion permits clearance for any irregularities in the substantially flat surface of the wall panel, for instance, window frames. A universal pivot joint is connected to the tilt frame so that, upon mounting the frame to the hoist, the frame can be tilted about the pivot joint between the horizontal and vertical planes through an angle of at least 90° and rotated about the pivot joint in a substantially horizontal plane through an angle of at least 180°. When the tilt frame is tilted to substantially the horizontal plane it can be locked in position to the cart. The cart has adjustable stops and spacers at one end. When the tilt frame is positioned in the vertical plane it rests against the stops. The stops can then be adjusted to position the structural member supported by the frame to the vertical plane. The spacers index the cart with respect to a vertical surface.

The mounting equipment for supporting the structural member may also include a T-shaped support member which has a hollow elongated stem portion open at both ends and a cross beam. H-arms are connected to either end of the cross beam and engage and support the member. By using either open end of the stem portion to mount the T-shaped support member to the hoist, the height of the cross beam above the surface on which the cart is resting, may be varied.

Figure 1:
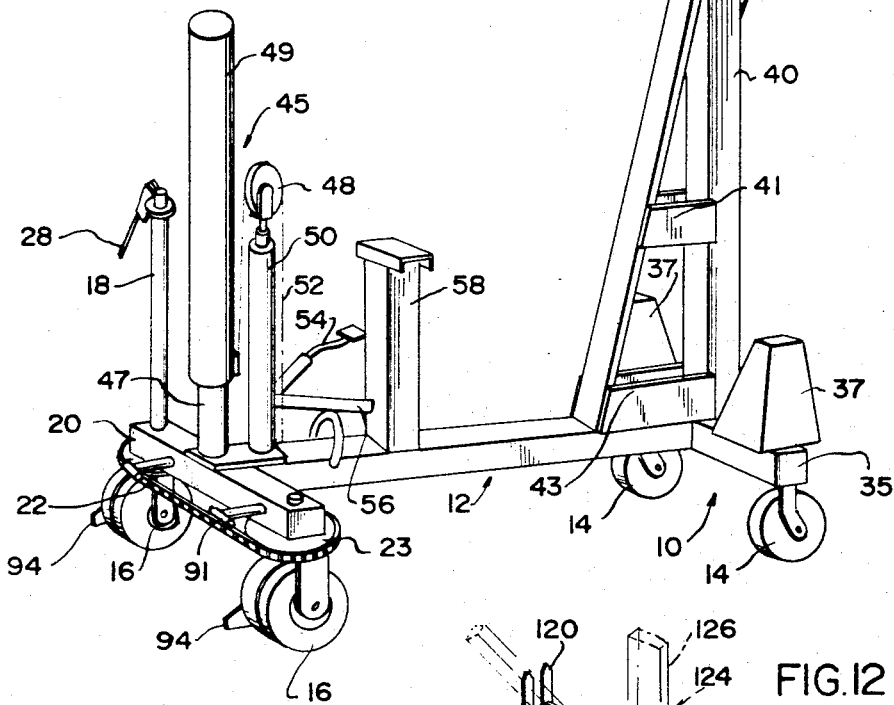
FIG. 1 is a perspective view of the panel cart in accordance with this invention.

In referring to the figures of the drawing, FIG. 1 shows the panel cart 10 in accordance with one embodiment of this invention. The panel cart 10 has a base structure 12 having a first end to which self-following casters 14 are mounted, and a second end to which a second set of casters 16 are mounted. A steering ass 18 is connected to the cross member 20 of the base 12. A pivot shaft 21 (FIG. 3) within the ass 18 is connected to sprocket 22 (FIG. 2). The sprocket 22 is connected to caster 16 which has double wheels 24. Another sprocket 23 is connected to the other caster 16 and also has double wheels 25. A chain 27 links the two sprockets to each other. Turning the handle 28 connected to the steering column 21 within the ass 18, turns the sprocket 22 to pivot the wheels 24. The turning of the sprocket 22 also drives the chain 27 to turn sprocket 23 which in turn pivots the wheel 25 in the same manner as the wheels 24 to steer the cart. The sets of double wheels of the casters 16 perform two functions. One, they permit the load of the panel cart 10 to be better distributed over the surface on which the cart is rolling, and two, they permit easier turning of the cart under heavy loaded conditions.

Two turn buckles, one is at 26 and the other is on the back loop of the chain 27 and is masked by buckle 26 in FIG. 3 so that it is not shown, are adjustable so that the wheels 24 and 25 can be indexed to each other and to the steering column 21. The buckles also serve to adjust the tension on chain 27.

As shown in FIG. 2, the steering handle 28 may be locked in two positions 29 and 30 on the pivot plate 32 of steering ass 18. These locked positions correspond to positions where the casters 16 are straight ahead and where they are parallel to the cross member 20. The locking position 30 of the pivot plate 32 is selected so that the handle 28 does not extend beyond the base structure 12 when the wheels are locked straight ahead. This is important when navigating the cart 10 through restricted areas such as doorways, since the handle 28 dictates the overall width of the cart 10.

A triangular support column 40 is mounted to the base section 12 and is used for supporting panels when loaded on the cart. The column 40 cross-support members 41 and 43 also serve as nail boxes to carry the nails used during the operation. A handle 42 is connected to the support 40 and is used to push the cart.

A hoist 45 is also included on the panel cart. The hoist consists of an inner column 47 which is connected to the cross member 20, and an elevating column 49 which is positioned over the inner column 47 in a telescoping relationship. A hydraulic jack 50 is connected to the base structure 12. A chain 52 is connected to the elevating column 49, passes over sheave 48, and is anchored to the base structure 12. Movement of foot pedal 54 causes the jack to rise, lifting the chain and sheave thereby raising the elevating column 49. In a like fashion the elevating column 49 may be lowered by stepping on the release pedal 56.

A foot support 58 is connected to the base 12 intermediate the hoist 45 and the triangular support 40. The support can be made adjustable to compensate for the difference in height of the various cart operators. Function of the foot support will be described subsequently.

Mounting equipment for supporting the structural members to be moved by the panel cart 12 is connected to the elevating column 49. This mounting equipment may take various forms. For instance, FIGS. 4–6 show a tilt frame 60 for supporting substantially flat structural members such as wall panels. The tilt frame 60 has mounting plates 62 and 63 on either end of the frame structure. Intermediate these two mounting frames is a bowed frame 65 which is supported by structural members 67. The bow of the intermediate portion 65 may be seen clearly in FIG. 4 where a flat panel section is simulatingly mounted to the ends 62 and 63 as represented by the dotted and dashed line 69. Midway between the end plates 62 and 63 is a solid panel section 70.

A universal pivot joint 72 is mounted to the section 70. The universal joint 72 includes two similar pillow block shafts 75 which are mounted to a bearing housing 77 and supported within the pillow block bearings 74. A bearing shaft 79 is rotatably supported within the bearing housing 77. Connected to the bearing shaft 79 is the tilt frame mounting tube 80. From this discussion it can be seen that if the mounting tube 80 is held in a stationary position the tilt frame 60 is free to tilt about the pillow block shaft 75 from the horizontal to the vertical plane at least through 90° and is also free to rotate within the bearing housing 77 in a substantially horizontal plane for at least 180°.

The operation of the tilt frame 60 when it is mounted on the panel cart 10 by telescoping tube 80 over the elevating column 49 may be understood from FIGS. 7–10. When constructing a building, the panels 85 are usually brought to the site of the construction in a truck. A boom crane then unloads the panels from the truck and stacks them upright on the floor of the building which has already been constructed. The most convenient method of unloading the panels 85 results in them being stacked in a position upside down from the position that they will be in when mounted.

Figure 7:
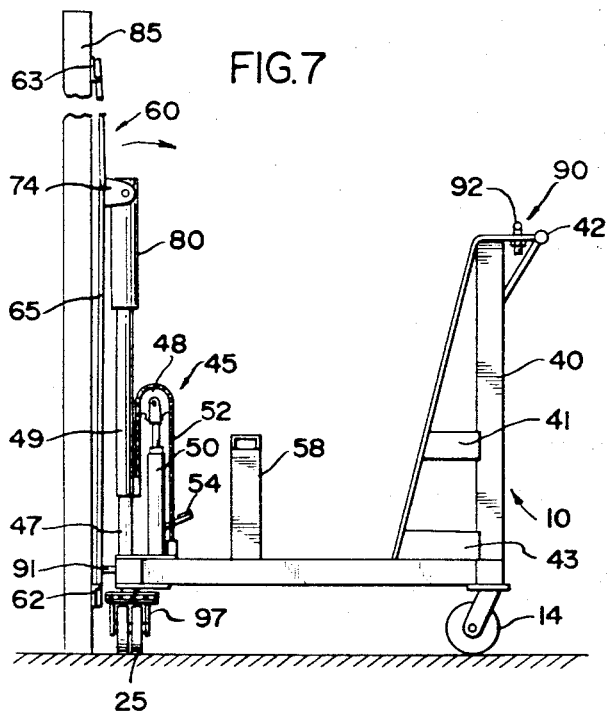
FIG. 7 is a side elevation of the device of this invention with the tilt frame in the vertical plane.

After they are stacked the panel cart 10 is rolled into position as shown in FIG. 7, and the tilt frame 60 is tilted about the joint 72 into a vertical position. In most instances where the panels 85 are unfinished, they are simply nailed to the tilt frame 60 at the end plates 62 and 63 through the holes 87 (FIG. 5) extending therethrough. If the panels are finished, they may be simply clamped to the end plates. The front set of caster wheels 24 and 25 are positioned parallel to the panel 85 to prevent fore and aft movement of the cart while nailing the panels 85 to the tilt frame 60. Mounted to a cross member 35 (FIG. 1) at the rear of the cart 10 are weights 37 which are used for counter balance when the front portion of the cart 10 is loaded down with the panels. Although the structural panels 85 are substantially flat by nature, they may have certain irregularities in their surface caused, for instance, by window frames. By having the intermediate portion 65 of the tilt frame 60 of a bowed construction, when the panels 85 are nailed to the end plates 62 and 63, the bow in the intermediate portion 65 permits clearance for the window frames.

After the panel 85 is secured to the tilt frame 60, the panel is hoisted off the floor by hoist 45, and the frame is tilted (FIG. 8) about universal pivot 72 to substantially the horizontal plane. It is then rotated in this plane about the pivot 72 and rested on the support 40. The panel 85 can then be locked into position by the lock 90. The lock 90 consists of an angle bolt 92 which may be fitted into the slot 94 (FIG. 5) and turned to secure the tilt frame 60 in position. The cart is now ready to be moved to the desired location.

Figure 8:
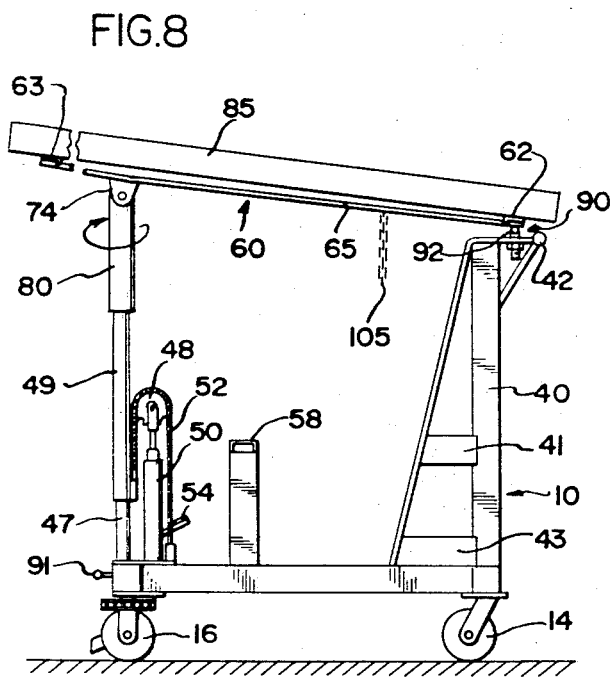
FIG. 8 is a side elevation of the device of FIG. 7 with the tilt frame in substantially the horizontal plane.
Figure 10:
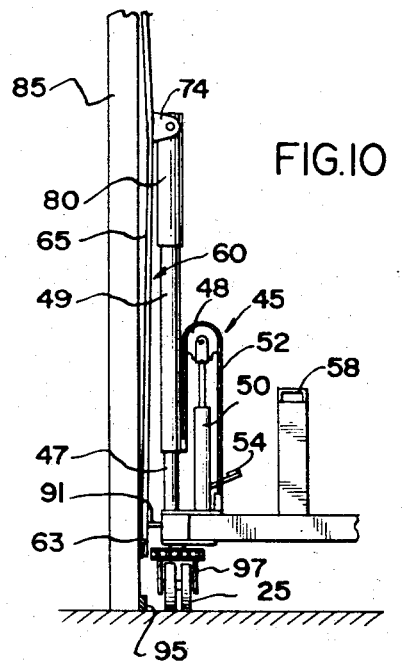
FIG. 10 is a side elevation view of the device of FIG. 7 with the tilt frame in the vertical plane.

The step shown in FIG. 8 accomplishes two things: Foremost, by being able to rotate the panel 85 at least 180° about the pivot 72, the panel, which was originally placed in an inverted position in the stack prior to mounting to the panel cart, has been in effect turned around so that when it is tilted back to the vertical for lowering into place, it will be in the proper position. Secondly, the locking feature permits the panel 85 to be secured on the panel cart 10 so that it may be left unattended for various periods of time without fear of the panel 85 acting as a sail and causing the cart to be moved or turned over by the wind.

Figure 9:
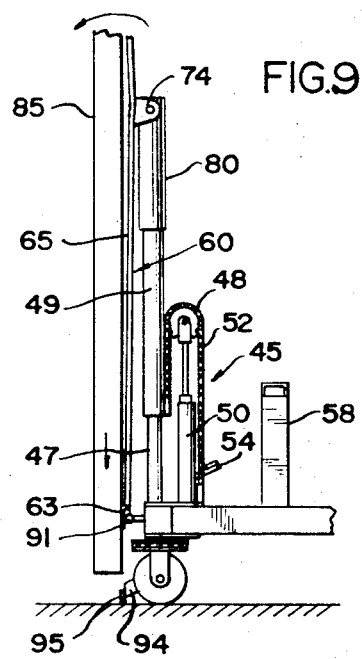
FIG. 9 is a side elevation view of the device of FIG. 7 with the tilt frame in a vertical plane.

Subsequent to the panel 85 being tilted, rotated and locked to the cart 10, the cart is then rolled into position for lowering the panel 85 into place (FIG. 9). Spacers 94 are used to index the cart with respect to the vertical anchor plate 95 which is mounted to the floor of the building when the floor is laid. The spacers 94 are mounted to the frame 97 that supports the front casters 16 as shown in FIG. 3. The spacers 94 may be pivoted about the axil 99 from a horizontal position to a vertical position where they rest against stops 101. The spacers 94 index the cart to the anchor plate 95 so that when the panel 85 is lowered in place by the hoist 45, the panel 85 will be positioned immediately adjacent to the anchor plate 95 so that it can be fixed to the anchor plate without further manipulation of the panel. The tilt frame 60 is then tilted back to the vertical plane and rests against the adjustable stops 91 that are threaded into member 20. Because the tilt frame is cantilever supported by the elevating column 49, the weight of the panel 85 can cause the column 49 to bend somewhat so that when it is tilted to the vertical plane the panel is not truly vertical. The adjustable stops 91 are then moved in or out as necessary to position the panel 85 in the vertical plane.

After the spacers index the panel cart 10 to the anchor plate 95, the front casters 24 and 25 are rotated parallel to the anchor plate 95 (FIG. 10), and the cart is then rolled parallel to the anchor plate until the panel 85 is in proper position to be set into place where it is then lowered by the hoist 45 into position. After the panel is secured to the anchor plate 95 and to the adjacent panel section, if there is one, the tilt frame end plates 62 and 63 are then removed from the panel, and the cart is rolled back to the stack to pick up another panel. When the spacers 94 are not being used to index the panel cart to the anchor plate, the are rotated up into the vertical position so that they will not be protruding from the front of the cart to hamper the cart's operation.

The importance of the panel cart when used with the tilt frame should be clear from the above discussion. It requires only one man to roll the cart into position at the panel pickup site. The panel cart operator then nails the panel to the tilt frame after which, using the hoist 45, he lifts the panel 85 off the floor, tilts it himself to the horizontal and rotates it 180°, and locks it to the cart. The operator then rolls the cart in position as described. The panel 85 after being rotated is slightly off balance and tends to tilt towards the forward part of the cart, because the universal pivot joint 72 is not quite in the center of the tilt frame 60, being closer to the end 62 which is the end of the frame over-hanging the front of the cart 10 in FIG. 8. Therefore, when the panel cart has been indexed to the anchor plate 95 and rolled into position, release of the lock will cause the panel 85 to tilt forward on its own volition. The panel cart operator then grasps the chain 105 which is connected to the tilt frame and places his foot on the foot support 58 and lowers the panel into position. While other men connect the panel to the anchor plate and to the adjoining sections, the panel cart operator removes the panel from the tilt frame and returns for another section. Therefore, the panel cart and tilt frame requires the use of only one man where other systems have required many more men.

Another form that the mounting equipment for supporting the structural member would take is that shown in FIGS. 11–14 and is a truss carrier 110. The truss carrier 110 includes a T-shaped support member having a hollow elongated stem 112 open at ends 114 and 115, and a cross beam 117 that forms the cap of the T. H-arms 120 are connected to each end of the beam 117. The H-arms 120 are used to support the truss members as will be described subsequently. The hollow stem 112 has holes 122 drilled therethrough which permits the position of the stem 112 on the elevating column 49 to be varied by placing a pin 111 through the holes 122. The stem 112 is then supported by the pin 111 resting on the top of the elevating column 49 (FIG. 1).

After the panel sections or exterior walls of the home are erected, the trusses and gables are unloaded from the truck and positioned so that they are supported by the walls with the peaks of the trusses and gables hanging in a downward direction towards the floor of the home.

Figure 11:
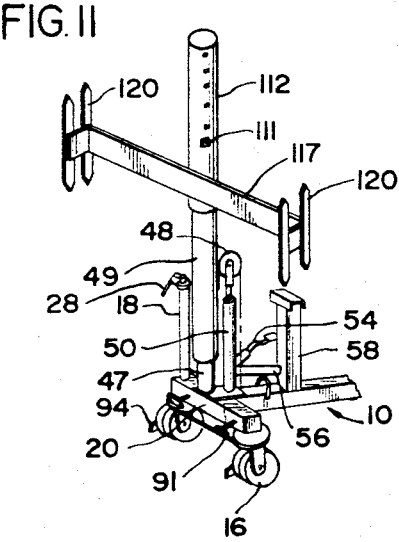
FIG. 11 is a perspective view of the device in accordance with this invention.
Figure 12:
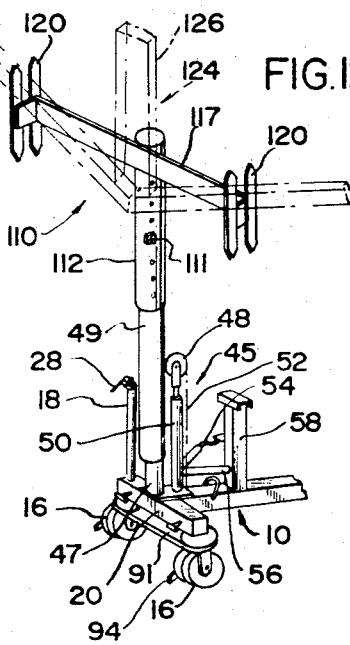
FIG. 12 is a perspective view of the device in accordance with this invention.

FIGS. 11 and 12 show the action of the panel cart with the truss carrier mounted thereto. In FIG. 12, the panel cart 10 is moved into position and the height of the truss carrier 110 is adjusted by positioning the pin 111 in the holes 122 as described. The position of the carrier 110 on the column 49 is selected so that with the column 49 in its lowered position the truss carrier 110 fits just under the truss 124. The hoist 45 then elevates the column 49 until the H-arms of the truss support 110 grips the frame of the truss support on either side. Ideally chosen, the weight of the truss which is acting through the member 126 and the peak of the truss will be directed mainly down the elongated stem 112 and the elevating column 49. In this position the truss 124 will be supported on either side by the H-arms 120. The hoist is then elevated, and the truss support 110 lifts the truss off of the wall sections so that the operator is able to move cart 10 along the floor to place the truss in the desired position. The truss is then rotated in some suitable manner so that the peak of the truss extends upward and it is secured in place to the walls.

FIG. 11 illustrates that, if the truss member after it is unloaded from the truck and placed in a suspended position on the walls of the structure hangs too low for the truss support 110 as shown mounted in FIG. 12, the truss support may be removed from the vertical column 49 and inverted so that open end 115 of the stem 112 will be placed over the elevating column 49. By doing this the beam 117, hence H-arms 120, will be placed in a lower position with relation to the base 12 of the cart or the surface upon which it is resting. This permits the truss support member 110 to be positioned beneath trusses 124 which are exceptionally high and therefore hang close to the floor after unloading, and provides for maximum lifting by the hoist 45.

It should be clear that by providing an exceptionally long elongated stem 112 for the truss carrier 110, that it would be possible for the trusses to be unloaded from the truck and supported in an upright position on the walls of the home. The elongated truss support could then grip the trusses in the upright position and move them for proper location along the walls of the home.

What has been described is an improved portable hoist for handling large pre-fabricated structural members that is of relatively simple construction, inexpensive and can be operated by one man. The portable hoist is extremely versatile in that it is able to handle trusses and gables as well as large panels of the pre-fabricated building. Furthermore, the hoist provides for the inverting of structural members that are stacked upside down for convenience during unloading.

I claim:
1. A device for handling a structural member, including in combination, a cart having a base structure with first and second ends, first and second caster means at said first and second ends of said cart respectively for moving said cart over a surface, steering means mounted on said base structure and connected to said first caster means for guiding said cart, hoist means including inner and outer columns, said inner column being connected to said base structure and the outer column acting as an elevating column in telescoping relation with said inner column, jacking means connected to said elevating column for raising and lowering the same, support means receiving the structural member, and connecting means including a universal joint removably connected over said elevating column, said support means having portions connected to the structural member for supporting the same so that the structural member can be moved on the surface by said cart and can be moved to a desired vertical position by said hoist, said universal joint permitting movement of said supporting means and the structural member between the horizontal and vertical planes through an angle at least 90°, and rotation of said support means and the structural member about said elevating column in a substantially horizontal plane through an angle of at least 180° to facilitate handling of the structural member.

2. A device for handling a substantially flat structural member, including in combination, a cart comprising a base structure having first and second ends, first and second caster means connected to said cart at each of said ends for moving said cart over a surface, and hoist means including a jack mounted to said base structure, a tilt frame including pivot means connected thereto, said tilt frame being constructed to support the flat structural member and being connected to said hoist means, said pivot means permitting tilting movement of said tilt frame between the horizontal and vertical planes through an angle of at least 90°, and rotation of said frame in a substantially horizontal plane through an angle at least 180°, said hoist means raising and lowering said tilt frame, and adjustable stop means connected to one end of said base structure, said tilt frame resting against said adjustable stop means when tilted to the vertical plane, and said stop means being adjusted to move the frame to align the structural member mounted thereto to the vertical plane.

3. The device for handling the substantially flat structural member of claim 2 wherein said tilt frame further includes first and second ends and a bowed intermediate portion, with the structural member being connected to said first and second ends, said bowed intermediate portion clearing any irregularities extending from the substantially flat surface of the structural member.

4. The device for handling the substantially flat structural member of claim 2 with said cart further including locking means and a support column mounted on said cart, said locking means being connected to said support column, with said frame being tilted to substantially the horizontal plane and resting on said support column, said locking means securing the same to said cart.

5. The device for handling the substantially flat structural member of claim 2 with said cart further including steering means for one of said caster means, and spacer means connected to said caster means for indexing said cart with respect to a vertical surface.

6. The device for handling the substantially flat structural member of claim 2 with said cart further including an upright support column mounted on said cart, with said tilt frame being tilted substantially to the horizontal plane one end of said frame rests on said support column, said pivot means being connected closer to the end of said tilt frame resting on said support column than the other end of said frame so that the weight of the frame acts to set up a moment about said pivot to tilt said frame from said support column to the vertical plane.

7. The device for handling the substantially flat structural member of claim 2 with said tilt frame further including variable positioned handle means connected to the same for grasping when the weight of said frame tilts the same to the vertical plane to control the rate of tilt.

References Cited

UNITED STATES PATENTS

| | | | |
|---|---|---|---|
| 2,828,870 | 4/1958 | Corley | 214—1 |
| 2,964,293 | 12/1960 | Foth | 214—1 X |
| 2,655,412 | 10/1953 | Jones. | |
| 3,221,900 | 12/1965 | Love | 214—1 |
| 3,314,553 | 4/1967 | Vircks | 214—1 |

GERALD M. FORLENZA, *Primary Examiner.*

FRANK E. WERNER, *Assistant Examiner.*

U.S. Cl. X.R.

214—700